US012731809B2

(12) United States Patent
Wen et al.

(10) Patent No.: US 12,731,809 B2
(45) Date of Patent: Sep. 8, 2026

(54) SPIRALLY WOUND ELECTRODE ASSEMBLY, BATTERY CELL, BATTERY AND ELECTRIC APPARATUS

(71) Applicant: CONTEMPORARY AMPEREX TECHNOLOGY (HONG KONG) LIMITED, Hong Kong (CN)

(72) Inventors: Yaoling Wen, Ningde (CN); Zhongping Luo, Ningde (CN); Wenfa Lin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 708 days.

(21) Appl. No.: 18/181,597

(22) Filed: Mar. 10, 2023

(65) Prior Publication Data

US 2023/0216077 A1 Jul. 6, 2023

Related U.S. Application Data

(63) Continuation of application No. PCT/CN2021/115572, filed on Aug. 31, 2021.

(51) Int. Cl.
*H01M 10/04* (2006.01)
*H01M 50/202* (2021.01)

(52) U.S. Cl.
CPC ... *H01M 10/0409* (2013.01); *H01M 10/0431* (2013.01); *H01M 50/202* (2021.01)

(58) Field of Classification Search
CPC ......... H01M 10/0409; H01M 10/0431; H01M 50/202; H01M 10/052; H01M 50/538;
(Continued)

(56) References Cited

U.S. PATENT DOCUMENTS

2017/0084901 A1 3/2017 Doo et al.
2017/0092926 A1 3/2017 Doo et al.
(Continued)

FOREIGN PATENT DOCUMENTS

CN 106257710 A 12/2016
CN 106549132 A 3/2017
(Continued)

OTHER PUBLICATIONS

Notice of Reasons for Refusal, JP application No. 2023-515864, dated Apr. 2, 2024.
(Continued)

*Primary Examiner* — Stewart A Fraser
(74) *Attorney, Agent, or Firm* — Ladas & Parry, LLP

(57) ABSTRACT

Disclosed are a wound electrode assembly, and a method and manufacturing apparatus for manufacturing the wound electrode assembly. The wound electrode assembly includes an electrode sheet. The electrode sheet includes a winding ending section, the winding ending section is provided with a plurality of first tabs, the plurality of first tabs are laminated, and among the two adjacent first tabs, a width of the first tab close to a winding center of the wound electrode assembly is greater than a width of the first tab away from the winding center. Among the two adjacent first tabs, a width of the first tab close to the winding center is greater than a width of the first tab away from the winding center. After the winding ending section is wound, the amount of misalignment between the two adjacent first tabs is reduced.

17 Claims, 8 Drawing Sheets

231

2316 23142 2314 23141

2315 2313 F E

(58) Field of Classification Search
CPC ........... H01M 50/533; H01M 10/0587; H01M 10/04; H01M 50/247; H01M 50/249
See application file for complete search history.

(56) References Cited

U.S. PATENT DOCUMENTS

| | | | | |
|---|---|---|---|---|
| 2020/0373546 | A1 | 11/2020 | Li et al. | |
| 2021/0376427 | A1* | 12/2021 | Cao | H01M 4/139 |
| 2023/0006315 | A1* | 1/2023 | Hosokawa | H01M 10/0585 |
| 2023/0238564 | A1* | 7/2023 | Hosokawa | H01M 50/184 429/179 |

FOREIGN PATENT DOCUMENTS

| | | | |
|---|---|---|---|
| CN | 106558680 | A | 4/2017 |
| CN | 207097936 | U | 3/2018 |
| CN | 110061182 | A | 7/2019 |
| CN | 112103455 | A | 12/2020 |
| CN | 212136591 | U | 12/2020 |
| EP | 3147967 | A1 | 3/2017 |
| EP | 3694043 | A1 | 8/2020 |
| JP | 2011081964 | A | 4/2011 |
| JP | 2016115422 | A | 6/2016 |
| JP | 2016139596 | A | 8/2016 |
| JP | 2021500734 | A | 1/2021 |
| JP | 2024502427 | A | 1/2024 |
| KR | 20130013823 | A | 2/2013 |
| KR | 20170036466 | A | 4/2017 |
| KR | 20210031849 | A | 3/2021 |
| WO | 2014027606 | A1 | 2/2014 |
| WO | 2020015362 | A1 | 1/2020 |
| WO | 2021251121 | A1 | 12/2021 |

OTHER PUBLICATIONS

Request for the Submission of an Opinion, KR application No. 10-2023-7008779, dated Jun. 4, 2025.
International Search Report for International Application PCT/CN2021/115572, mailed Mar. 30, 2022.
Written Opinion of International Search Authority for International Application PCT/CN2021/115572, mailed Mar. 30, 2022.
Decision to Grant a Patent for JP application No. 2023-515864, dated Oct. 1, 2024.
Extended European search report for EP application No. 21955296, dated Sep. 4, 2024.
Office action from corresponding Chinese Patent Application No. 202180082913.0 dated Mar. 19, 2026 with search report.

* cited by examiner

SPIRALLY WOUND ELECTRODE ASSEMBLY, BATTERY CELL, BATTERY AND ELECTRIC APPARATUS

CROSS REFERENCE TO RELATED APPLICATION

This application is a continuation of International Patent Application No. PCT/CN2021/115572, filed on Aug. 31, 2021, which is incorporated herein by reference in its entirety.

TECHNICAL FIELD

The present application relates to the technical field of batteries, in particular to a wound electrode assembly, a battery cell, a battery, an electrical device, and a method and manufacturing apparatus for the wound electrode assembly.

BACKGROUND

At present, lithium-ion batteries are widely used in a vehicle, a portable appliance, a mobile phone, a spacecraft and other fields to provide electric energy for them.

Many design factors, such as energy density, a cycle life, a discharge capacity, a charge-discharge rate and other performance parameters, should be considered in development of a battery technology. In addition, the safety of the battery further needs to be considered, and a short circuit inside the battery is one of the important factors affecting safety performance of the battery. Therefore, how to reduce a risk of the short circuit inside the battery becomes an urgent problem to be solved.

SUMMARY

Embodiments of the present application provide a wound electrode assembly, a battery cell, a battery, an electrical device, and a method and manufacturing apparatus for the wound electrode assembly.

In a first aspect, an embodiment of the present application provides a wound electrode assembly, including: an electrode sheet. The electrode sheet includes a winding ending section, the winding ending section is provided with a plurality of first tabs, the plurality of first tabs are laminated, and among the two adjacent first tabs, a width of the first tab close to a winding center of the wound electrode assembly is greater than a width of the first tab away from the winding center.

In the above technical solution, the plurality of first tabs are laminated, and among the two adjacent first tabs, the width of the first tab close to the winding center is greater than the width of the first tab away from the winding center. In other words, from inside to outside, the widths of the plurality of first tabs gradually decrease, and after the winding ending section is wound, the amount of misalignment between the two adjacent first tabs is reduced in a width direction of the first tabs, so that the total amount of misalignment shown by the plurality of first tabs is small, the risk of short circuit caused by the large amount of misalignment of the plurality of first tabs in the width direction of the first tabs of the electrode assembly is reduced, and safety performance of a battery cell is improved. The total amount of misalignment shown by the plurality of first tabs is small, therefore the same connection region can correspond to more first tabs, which is beneficial to increase a size of the electrode assembly in a thickness direction, and can improve the energy density of the battery cell.

In some embodiments of the first aspect of the present application, the electrode sheet further includes a winding start section connected with the winding ending section, the winding start section is provided with a second tab, and the second tab and the plurality of the first tabs are laminated. A width of the second tab is greater than or equal to a width of the first tab closest to the winding center among the plurality of first tabs.

In the above technical solution, in an actual winding process, the amount of misalignment of the second tab on the winding start section of the electrode assembly is small in a width direction of the second tab, therefore, the width of the second tab is greater than or equal to the width of the plurality of first tabs, so that the tabs of the electrode assembly may have a good current-carrying capacity and a good heat-dissipating capacity without affecting the total amount of misalignment of the tabs of the electrode assembly.

In some embodiments of the first aspect of the present application, the quantity of the second tabs is multiple, the plurality of second tabs are laminated, and the widths of the plurality of second tabs are equal.

In the above technical solution, the widths of the plurality of second tabs are equal, which not only facilitates manufacturing, but also enables the tabs to have the good current-carrying capacity and heat-dissipating capacity.

In some embodiments of the first aspect of the present application, the quantity of the second tabs is less than or equal to 25.

In the above technical solution, as a winding radius of the electrode sheet increases, the amount of misalignment of the tabs increases. Therefore, the quantity of the second tabs is less than or equal to 25, which can effectively reduce the total amount of misalignment of the first tabs and the second tabs in the width direction of the first tabs, and reduce the risk of the short circuit caused by the large amount of misalignment of the plurality of first tabs in the width direction of the first tabs.

In some embodiments of the first aspect of the present application, the quantity of the second tabs is multiple, and the plurality of second tabs are laminated. Among the two adjacent second tabs, the width of the second tab close to the winding center is greater than the width of the second tab away from the winding center.

In the above technical solution, the plurality of second tabs are laminated in the same direction as the stacking direction of the plurality of first tabs, and among the two adjacent second tabs, the width of the second tabs close to the winding center is greater than the width of the second tabs away from the winding center. In other words, from the inside to the outside, the widths of the plurality of second tabs gradually decrease, so that the second tabs have the good current-carrying capacity and the good heat-dissipating capacity.

In some embodiments of the first aspect of the present application, the first tabs have connection ends and free ends, and the connection ends are connected to one end of the winding ending section in the width direction of the electrode sheet; and the width of each first tab of the plurality of first tabs gradually decreases in a direction from the connection ends to the free ends.

In the above technical solution, in the direction from the connection ends to the free ends of the first tabs, the width of each first tab gradually decreases to avoid interference with other components. In addition, on the basis of ensuring a welding area between the first tabs and other components, the connection strength between the first tabs and the winding ending section is increased.

In some embodiments of the first aspect of the present application, a width difference between the two adjacent first tabs is equal.

In the above technical solution, the width difference between the two adjacent first tabs is equal. That is, in the direction of the first tabs facing away from the winding center, the widths of the plurality of first tabs decrease linearly, which can reduce the total amount of misalignment of the plurality of first tabs in the width direction of the first tabs, and reduce the risk of the short circuit caused by the large amount of misalignment of the plurality of first tabs in the width direction of the first tabs.

In some embodiments of the first aspect of the present application, in the stacking direction of the plurality of first tabs, the width difference between the two adjacent first tabs gradually increases in the direction of the plurality of first tabs facing away from the winding center.

In the above technical solution, the width difference between the two adjacent first tabs gradually increases, which can reduce the total amount of misalignment generated by the plurality of first tabs in the width direction of the first tabs, and reduce the risk of the short circuit of the electrode assembly caused by the large amount of misalignment of the plurality of first tabs in the width direction of the first tabs.

In some embodiments of the first aspect of the present application, in the stacking direction of the plurality of first tabs, the width difference between the two adjacent first tabs is 0.5 mm-4 mm in the direction of the plurality of first tabs facing away from the winding center.

In the above technical solution, the width difference between the two adjacent first tabs is 0.5 mm-4 mm, which can effectively reduce the risk of the short circuit caused by the large amount of misalignment of the plurality of first tabs in the width direction of the first tabs, and can further ensure the current-carrying capacity and the heat-dissipating capacity of the first tabs. In the case where the width difference between the two adjacent first tabs is less than 0.5 mm, among the two adjacent first tabs, the width of one first tab away from the winding center is not significantly decreased relative to the width of one first tab close to the winding center, and finally the total amount of misalignment of the plurality of first tabs is not significantly reduced, which cannot effectively reduce the risk of the short circuit caused by the large amount of misalignment of the plurality of first tabs in the width direction of the first tabs. In the case where the width difference between the two adjacent first tabs is greater than 4 mm, among the two adjacent first tabs, the width of one first tab away from the winding center is decreased too much relative to the width of one first tab close to the winding center, which makes it difficult to ensure the current-carrying capability and heat-dissipating capacity of the first tabs.

In some embodiments of the present application, in the stacking direction of the plurality of first tabs, the height of the plurality of first tabs gradually decreases in the direction of the plurality of first tabs facing away from the winding center.

In some embodiments of the present application, the height of the plurality of first tabs gradually decreases in the direction of the plurality of first tabs facing away from the winding center. That is, the width and height of the first tabs decrease synchronously, so that the risk of the first tabs are prone to being folded after the width decreases.

In some embodiments of the first aspect of the present application, a ratio of the width to the height of each first tab of the plurality of first tabs is the same.

In some embodiments of the present application, the ratio of the width to the height of each first tab of the plurality of first tabs is the same. After the width of the first tabs decreases, the height of the first tabs synchronously decreases, which reduces the risk that the first tabs are prone to being folded after the width decreases.

In some embodiments of the first aspect of the present application, a distance between the two adjacent first tabs gradually increases in a winding direction of the wound electrode assembly.

In the above technical solution, the distance between the two adjacent first tabs gradually increases in the winding direction of the wound electrode assembly, which can reduce the amount of misalignment of the two adjacent first tabs, and thus reduce the risk of the short circuit caused by the large amount of misalignment of the plurality of first tabs in the width direction of the first tabs.

In a second aspect, an embodiment of the present application provides a battery cell, including a case and the wound electrode assembly provided by the embodiment of the first aspect, wherein the wound electrode assembly is accommodated in the case.

In the above technical solution, from inside to outside, widths of a plurality of first tabs of a winding ending section gradually decrease, and after the winding ending section is wound, the amount of misalignment between the two adjacent first tabs is reduced in a width direction of the first tabs, so that the total amount of misalignment shown by the plurality of first tabs is small, and a risk of a short circuit caused by the large amount of misalignment of the plurality of first tabs in the width direction of the first tabs is reduced. The total amount of misalignment shown by the plurality of first tabs is small, therefore the same connection region can correspond to more first tabs, which is beneficial to increase a size of the electrode assembly in a thickness direction, and improves energy density of the battery cell.

In a third aspect, an embodiment of the present application provides a battery, including a box body and the battery cell provided by the embodiment of the second aspect, wherein the battery cell is accommodated in the box body.

In the above technical solution, from inside to outside, widths of a plurality of first tabs of a winding ending section gradually decrease, and after the winding ending section is wound, the amount of misalignment between the two adjacent first tabs is reduced in a width direction of the first tabs, so that the total amount of misalignment shown by the plurality of first tabs is small, a risk of a short circuit caused by the large amount of misalignment of the plurality of first tabs in the width direction of the first tabs is reduced, and safety performance of the battery can also be improved. The total amount of misalignment shown by the plurality of first tabs is small, therefore the same connection region can correspond to more first tabs, which is beneficial to increase a size of the electrode assembly in a thickness direction, and improves energy density of the battery.

In a fourth aspect, an embodiment of the present application provides an electrical device, including the battery cell provided by the embodiment in the second aspect.

In the above technical solution, the total amount of misalignment shown by a plurality of first tabs is small, which reduces a risk of a short circuit caused by the large amount of misalignment of the plurality of first tabs in a width direction of the first tabs, can also improve safety performance of the battery cell, and improves electrical safety of the electrical device. The total amount of misalignment shown by the plurality of first tabs is small, therefore the same region can correspond to more first tabs, which is beneficial to increase a size of an electrode assembly in a thickness direction, and improves energy density of the battery cell, so as to meet the larger and longer-term electric energy demands of the electrical device.

In a fifth aspect, an embodiment of the present application provides a method for manufacturing a wound electrode assembly, including:

providing an electrode sheet, wherein the electrode sheet includes a winding ending section, and the winding ending section is provided with a plurality of first tabs; and winding the electrode sheet around a winding center, so that the plurality of the first tabs are laminated.

Wherein, among the two adjacent first tabs, a width of the first tab close to the winding center of the wound electrode assembly is greater than a width of the first tab away from the winding center.

In the above technical solution, the electrode sheet is wound around the winding center, so that the plurality of the first tabs are laminated. The total amount of misalignment shown by the plurality of first tabs is small, which reduces a risk of a short circuit caused by the large amount of misalignment of the plurality of first tabs in a width direction of the first tabs, can also improve safety performance of a battery cell, and improves electrical safety of an electrical device. The total amount of misalignment shown by the plurality of first tabs is small, therefore the same region can correspond to more first tabs, which is beneficial to increase a size of the electrode assembly in a thickness direction, and improves energy density of the battery cell.

In a sixth aspect, an embodiment of the present application provides a manufacturing apparatus for a wound electrode assembly, including a providing means and an assembling means. The providing means is configured to provide an electrode sheet, wherein the electrode sheet includes a winding ending section, and the winding ending section is provided with a plurality of first tabs. The assembling means is configured to wind the electrode sheet around a winding center, so that the plurality of the first tabs are laminated. Wherein, among the two adjacent first tabs, a width of the first tab close to the winding center of the wound electrode assembly is greater than a width of the first tab away from the winding center.

In the above technical solution, the assembling means winds the electrode sheet around the winding center, so that the plurality of the first tabs are laminated. The total amount of misalignment shown by the plurality of first tabs is small, which reduces a risk of a short circuit caused by the large amount of misalignment of the plurality of first tabs in a width direction of the first tabs, can also improve safety performance of a battery cell, and improves electrical safety of an electrical device. The total amount of misalignment shown by the plurality of first tabs is small, therefore the same region can correspond to more first tabs, which is beneficial to increase a size of the electrode assembly in a thickness direction, and improves energy density of the battery cell.

BRIEF DESCRIPTION OF DRAWINGS

To more clearly describe the technical solutions in embodiments of the present application, the drawings to be used in the embodiments will be briefly introduced below. It should be understood that the following drawings only show some embodiments of the present application, and therefore, they should not be regarded as a limitation to the scope. For those of ordinary skills in the art, other related drawings may also be obtained based on these drawings without making creative work.

REFERENCE NUMBERS

Figures 1, 2, 3:
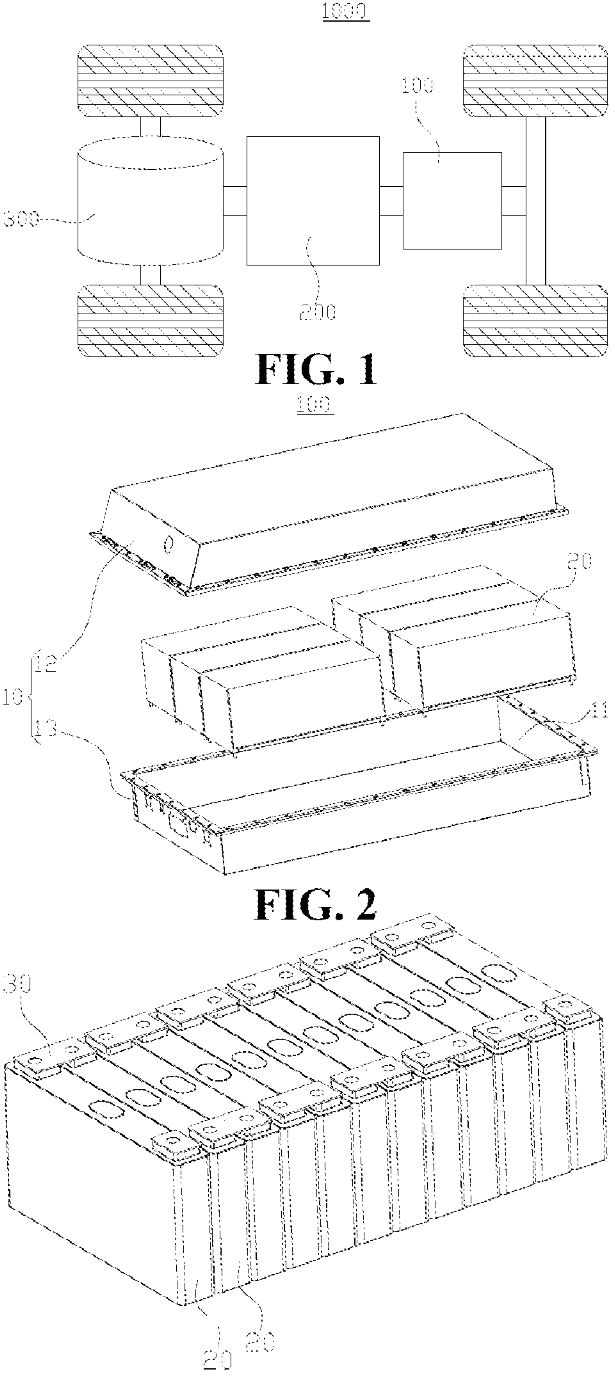
FIG. 1 is a schematic structural diagram of a vehicle provided by some embodiments of the present application.
FIG. 2 is a schematic structural diagram of a battery provided by some embodiments of the present application.
FIG. 3 is a schematic structural diagram of a plurality of battery cells connected by a bus component provided by some embodiments of the present application.

1000—vehicle;
100—battery;
10—box body;
11—accommodating space;
12—first part;
13—second part;
20—battery cell;
21—case;
211—opening;
22—end cap assembly;
221—end cap;
222—first electrode terminal;
223—second electrode terminal;
224—current collecting component;
**224*a***—first current collecting component;
**224*b***—second current collecting part;
225—pressure relief mechanism;
23—electrode assembly;
231—electrode sheet;
2311—positive electrode tab;
2312—negative electrode tab;
2313—winding ending section;
2314—first tab;
23141—connection end;

23142—free end;
2315—winding start section;
2316—second tab;
30—bus component;
200—controller;
300—motor;
2000—manufacturing apparatus for wound electrode assembly;
2100—providing means;
2200—assembling means;
A—length direction of electrode assembly;
B—axis direction of electrode assembly;
C—thickness direction of electrode assembly;
D—winding direction;
E—length direction of electrode sheet;
F—width direction of electrode sheet;
P—thickness center plane.

DETAILED DESCRIPTION

For the objects, technical solutions and advantages of the embodiments of the present application to be clearer, the technical solutions in the embodiments of the present application will be clearly and completely described below in conjunction with the drawings in the embodiments of the present application, and it is apparent that the described embodiments are a part of the embodiments of the present application rather than all the embodiments. The assembly of the embodiments of the present application generally described and illustrated in the drawings herein can be arranged and designed in a variety of different configurations.

Accordingly, the following detailed description of the embodiments of the present application provided in the drawings is not intended to limit the scope of the claimed application, rather it is only representative of selected embodiments of the present application. Based on the embodiments in the present application, all other embodiments obtained by those of ordinary skill in the art without creative effort fall within the protection scope of the present application.

It should be noted that in case of no conflicts, the embodiments in the present application and the features in the embodiments can be combined with each other.

It should be noted that like numerals and letters refer to like items in the following drawings, so once an item is defined in one drawing, it does not require further definition and explanation in subsequent drawings.

In the description of the embodiments of the present application, it should be noted that the indicated orientation or positional relationship is the orientation or positional relationship shown based on the drawings, or the orientation or positional relationship that is usually placed when the application product is used, or the orientation or positional relationship that is commonly understood by those skilled in the art, and is only for It is only for the convenience of describing the present application and for simplifying the description, but do not indicate or imply that the apparatuses or elements referred to must have particular orientations, be constructed and operated in particular orientations, and therefore cannot be construed as a limitation of the present application. In addition, the terms “first”, “second” and “third” are only used to differentiate the description, and cannot be construed as indicating or implying relative importance.

A wound electrode assembly is formed by stacking and winding a positive electrode sheet, a separator and a negative electrode sheet. Positive electrode tabs of the positive electrode sheet are laminated, and each positive electrode tab is required to be completely overlapped or the amount of misalignment should be controlled within a certain range. Negative electrode tabs of the negative electrode sheet are laminated, and each negative electrode tab is required to be completely overlapped or the amount of misalignment should be controlled within a certain range. However, in the process of winding the electrode assembly, a winding radius of the electrode sheet becomes larger and larger, resulting in a larger total amount of misalignment shown by the positive electrode tabs and/or the negative electrode tabs.

However, the large total amount of misalignment of the tabs will lead to many problems. For example, the large total amount of misalignment of the tabs leads to decrease of a distance between the positive electrode tabs and the negative electrode tabs, increase of a risk of a short circuit, and influence on safety of a battery cell. For another example, the large total amount of misalignment of the tabs leads to a small overlap area between the tabs, which reduces a welding area with other components (such as an electrode terminal, an end cap, and a current collecting component), thereby reducing a current-carrying area, and affecting the safety of battery cell.

Based on this, in order to improve the problem of misalignment of the tabs, the inventor designed an electrode assembly after in-depth research. A plurality of first tabs at a winding ending section of an electrode sheet are laminated, and among the two adjacent first tabs, a width of the first tab close to a winding center of the wound electrode assembly is greater than a width of the first tab away from the winding center. In other words, from inside to outside, the widths of the plurality of first tabs gradually decrease, the amount of misalignment between the two adjacent first tabs is reduced, so that the total amount of misalignment shown by the plurality of first tabs is small, and the risk of the short circuit is reduced. The total amount of misalignment shown by the plurality of first tabs is small, therefore the same connection region can correspond to more first tabs, which is beneficial to increase a size of the electrode assembly in a thickness direction, and can improve the energy density of the battery cell.

The technical solutions described in the embodiments of the present application are applicable to a battery and an electrical device using the battery.

The electrical device may be a vehicle, a mobile phone, a portable device, a laptop, a ship, a spacecraft, an electric toy, an electric tool, and the like. The vehicle may be a fuel vehicle, a gas vehicle or a new energy vehicle. The new energy vehicle may be an all-electric vehicle, a hybrid vehicle, an range extended electric vehicle, or the like. The spacecraft includes airplanes, rockets, space shuttles, spaceships, and the like. The electric toy includes fixed or mobile electric toys, such as game consoles, electric car toys, electric ship toys and electric aircraft toys. The electric tool includes metal cutting electric tools, grinding electric tools, assembly electric tools and railway electric tools, such as electric drills, electric grinders, electric wrenches, electric screwdrivers, electric hammers, impact drills, concrete vibrators and electric planers. The embodiments of the present application do not impose special limitations on the above electrical device.

In the following embodiments, for convenience of description, the electrical device being a vehicle is taken as an example for description.

Please refer to FIG. 1, which is a schematic structural diagram of a vehicle 1000 provided by some embodiments of the present application. The vehicle 1000 may be a fuel vehicle, a gas vehicle, or a new energy vehicle, and the new energy vehicle may be an all-electric vehicle, a hybrid vehicle, an range extended electric vehicle, or the like.

The interior of the vehicle 1000 is provided with a battery 100, which can be arranged at the bottom or head or tail of the vehicle 1000. The battery 100 may be used to supply power to the vehicle 1000, for example, the battery 100 may serve as an operating power source for the vehicle 1000.

Vehicle 1000 may further include controller 200 and motor 300, wherein controller 200 is configured to control battery 100 to power motor 300, for example, for the operating power demand when vehicle 1000 is starting, navigating, and driving.

In some embodiments of the present application, the battery 100 not only may serve as the operating power source of the vehicle 1000, but also may serve as a driving power source of the vehicle 1000, thus replacing or partially replacing fuel or natural gas to provide driving power for the vehicle 1000.

Please refer to FIG. 2, which is a schematic structural diagram of the battery 100 provided by some embodiments of the present application. The battery 100 includes a box body 10 and a battery cell 20, and the battery cell 20 is accommodated in the box body 10.

The box body 10 is used to provide an accommodating space 11 for the battery cell 20. In some embodiments, the box body 10 may include a first part 12 and a second part 13, and the first part 12 and the second part 13 are covered with each other to define the accommodating space 11 for accommodating the battery cell 20. Of course, connection between the first part 12 and the second part 13 may be sealed by a sealing member (not shown in the figure), and the sealing member may be a sealing ring, a sealant or the like.

The first part 12 and the second part 13 may be in various shapes, such as a cuboid and a cylinder. The first part 12 may be of a hollow structure with one side open, and the second part 13 may also be of a hollow structure with one side open. The open side of the second part 13 covers the open side of the first part 12 to form the box body 10 having the accommodating space 11. Of course, the first part 12 may also be of a hollow structure with one side open, and the second part 13 may be of a plate-like structure. The second part 13 covers the open side of the first part 12 to form the box body 10 with the accommodating space 11.

In the battery 100, there may be one or more battery cells 20. If there are the plurality of battery cells 20, the plurality of battery cells 20 may be connected in series or in parallel or in a mixed connection. The mixed connection means that the plurality of battery cells 20 are connected in both series and parallel. The plurality of battery cells 20 may be directly connected in series or parallel or in mixed connection together, and then the whole constituted by the plurality of battery cells 20 is accommodated in the box body 10. Of course, the plurality of battery cells 20 may also be first connected in series or parallel or in mixed connection to form a battery module, and the plurality of battery modules are connected in series or parallel or in mixed connection to form a whole which is accommodated in the box body 10. The battery cells 20 may be in the shape of a cylinder, a flat body, a cuboid or others. FIG. 2 exemplarily shows a case where the battery cells 20 are square.

Please refer to FIG. 3, which is a schematic structural diagram of the plurality of battery cells 20 connected by a bus component 30 provided by some embodiments of the present application. In some embodiments, the battery 100 may further include the bus component 30, and the plurality of battery cells 20 may be electrically connected through the bus component 30, so as to realize parallel connection, series connection or mixed connection of the plurality of battery cells 20.

Figure 4:
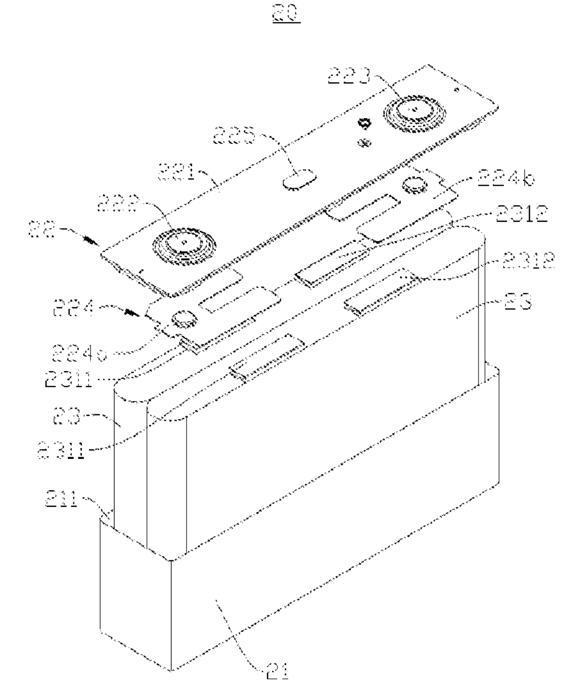
FIG. 4 is an exploded view of a battery cell provided by some embodiments of the present application.

Please refer to FIG. 4, which is an exploded view of the battery cell 20 provided by some embodiments of the present application. The battery cell 20 may include a case 21, an end cap assembly 22 and an electrode assembly 23. The case 21 has an opening 211, the electrode assembly 23 is accommodated in the case 21, and the end cap assembly 22 is used to cover the opening 211.

Figure 5:
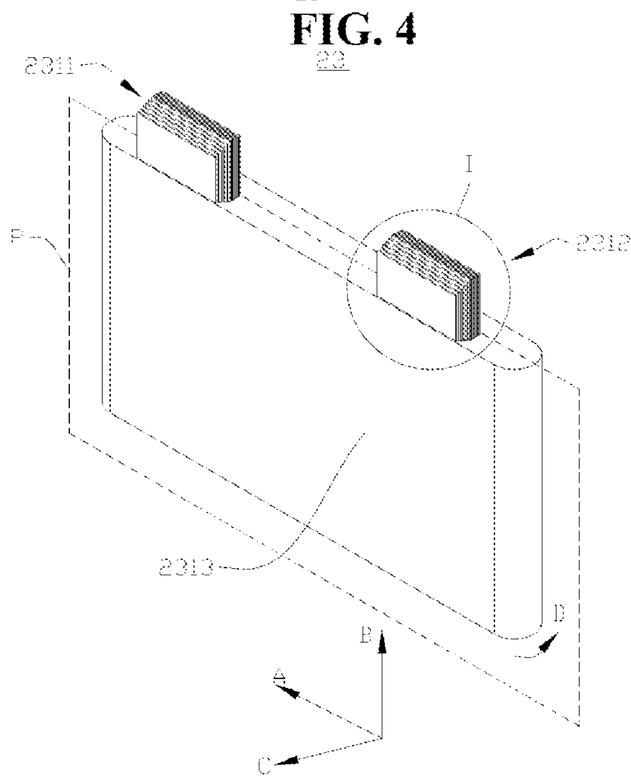
FIG. 5 is a schematic structural diagram of a wound electrode assembly provided by some embodiments of the present application.

The case 21 may be in various shapes, such as a cylinder and a cuboid. The shape of the case 21 may be determined according to the specific shape of the electrode assembly 23. For example, if the electrode assembly 23 is of a cylindrical structure, the case 21 may be selected as a cylindrical structure; and if the electrode assembly 23 is of a cuboid structure, the case 21 may be selected as a cuboid structure. FIG. 5 exemplarily shows a case where the case 21 and the electrode assembly 23 are square.

A material of the case 21 may be various, such as copper, iron, aluminum, stainless steel and aluminum alloy, which is not particularly limited in the embodiments of the present application.

The end cap assembly 22 is used to cover the opening 211 of the case 21 to form a closed accommodating cavity (not shown in the figure), and the accommodating cavity is used to accommodate the electrode assembly 23. The accommodating cavity is further used to accommodate an electrolyte, such as an electrolyte solution. The end cap assembly 22 is used as a component for outputting electric energy of the electrode assembly 23, and an electrode terminal in the end cap assembly 22 is used for being electrically connected with the electrode assembly 23, that is, the electrode terminal is electrically connected with tabs of the electrode assembly 23. In some embodiments, the electrode terminal and the tabs are connected through a current collecting component 224 to realize the electrical connection between the electrode terminal and the tabs.

It should be noted that the case 21 may have one or two openings 211. If the case 21 has one opening 211, the end cap assembly 22 may also be one, and the two electrode terminals may be arranged in the end cap assembly 22. The two electrode terminals are respectively used for being electrically connected with a positive electrode tab 2311 and a negative electrode tab 2312 of the electrode assembly 23, and the two electrode terminals in the end cap assembly 22 are a positive electrode terminal and a negative electrode terminal respectively. If the case 21 has the two openings 211, for example, the two openings 211 are formed in two opposite sides of the case 21, there may also be two end cap assemblies 22, and the two end cap assemblies 22 respectively cover the two openings 211 of the case 21. In this case, the electrode terminal in one end cap assembly 22 may be a positive electrode terminal for being electrically connected with the positive electrode tab 2311 of the electrode assembly 23; and the electrode terminal in the other end cap assembly 22 may be a negative electrode terminal for being electrically connected with the negative electrode tab 2312 of the electrode assembly 23.

As shown in FIG. 4, the battery cell 20 has one end cap assembly 22. An end cap 221 is provided with a first electrode terminal 222 for being electrically connected with the positive electrode tab 2311 and a second electrode terminal 223 for being electrically connected with the negative electrode tab 2312. The battery cell 20 further includes a first current collecting component **224*a* and a second current collecting component 224***b*, the positive electrode tab 2311 and the first electrode terminal 222 are electrically connected through the first current collecting component 224*a*, and the negative electrode tab 2312 and the second electrode terminal 223 are electrically connected through the second current collecting component 224*b*.

The end cap assembly 22 is further provided with a pressure relief mechanism 225 for actuating to relieve pressure inside the battery cell 20 when the temperature or pressure inside the battery cell 20 reaches a threshold value. The pressure relief mechanism 225 may take the form of an explosion-proof valve, an explosion-proof sheet, a gas valve, a pressure relief valve or a safety valve, etc., and may specifically adopt a pressure-sensitive or temperature-sensitive element or structure. That is, when the internal pressure or temperature of the battery cell 20 reaches a predetermined threshold value, the pressure relief mechanism 225 executes an action or a weak structure provided in the pressure relief mechanism 225 is damaged, so as to form an opening or channel for releasing the internal pressure or temperature.

Figures 6, 7:
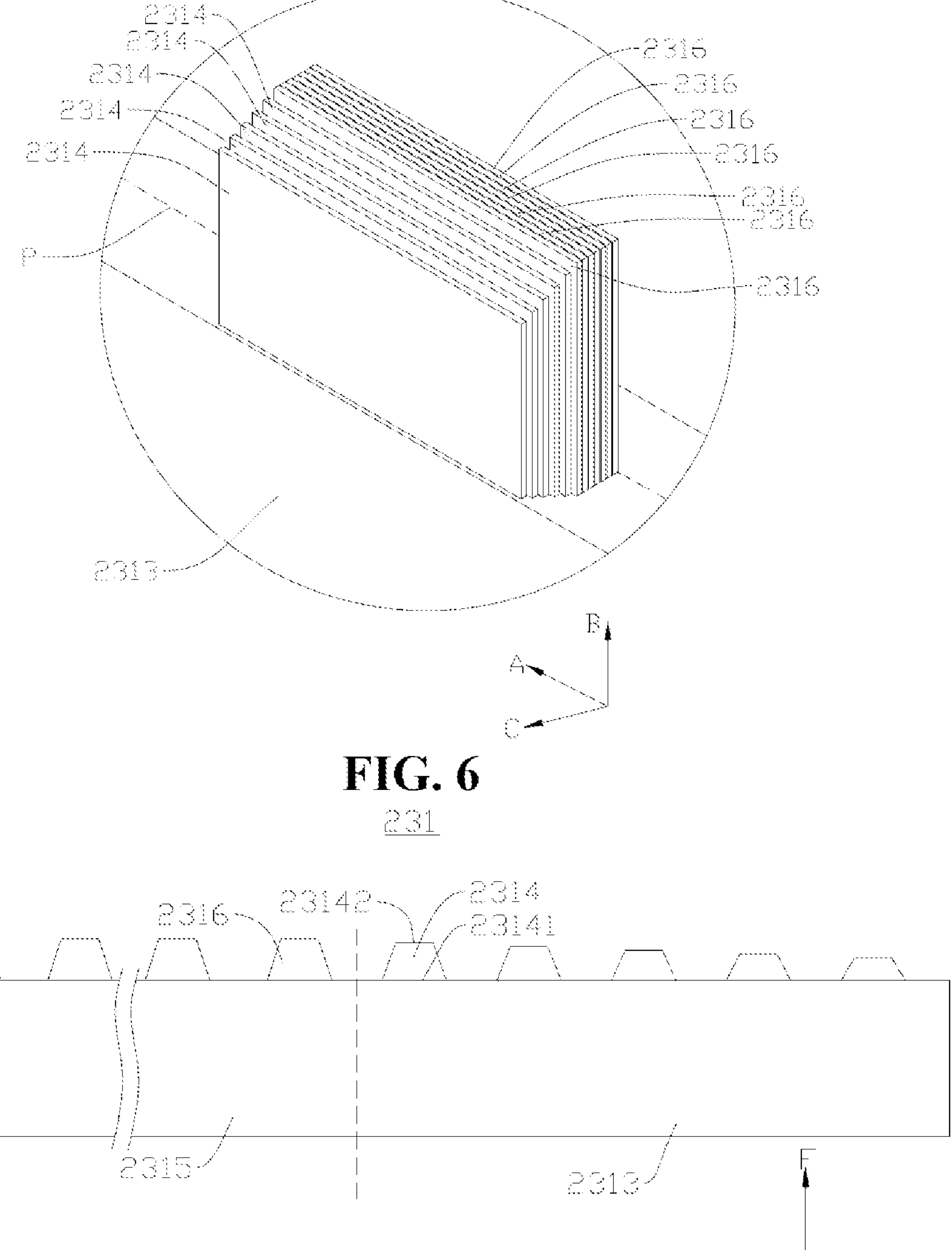
FIG. 6 is an enlarged view of I in FIG. 5.
FIG. 7 is a schematic expanded view of an electrode sheet provided by some embodiments of the present application.

As shown in FIGS. 5, 6 and 7, FIG. 5 is a schematic structural diagram of a wound electrode assembly 23 provided by some embodiments of the application, FIG. 6 is an enlarged view of I in FIG. 5, and FIG. 7 is an expanded schematic view of the electrode sheet 231 provided by some embodiments of the present application. In some embodiments, the electrode assembly 23 is the wound electrode assembly 23, and the wound electrode assembly 23 includes an electrode sheet 231. The electrode sheet 231 includes a winding ending section 2313, the winding ending section 2313 is provided with a plurality of first tabs 2314, the plurality of first tabs 2314 are laminated, and among the two adjacent first tabs 2314, a width of the first tab 2314 close to a winding center of the wound electrode assembly 23 is greater than a width of the first tab 2314 away from the winding center.

The wound electrode assembly 23 may include a positive electrode sheet, a negative electrode sheet and a separator. The wound electrode assembly 23 is a wound structure formed by winding the positive electrode sheet, the separator and the negative electrode sheet. The separator is used to separate the positive electrode sheet and the negative electrode sheet to reduce a risk of a short circuit due to contact between the positive electrode sheet and the negative electrode sheet.

The number of turns of the winding ending section 2313 extending from a winding end in an opposite direction of a winding direction is m, and the total number of turns of the electrode sheet 231 is n, where $m<n$, $m>2$, that is, the number of turns of the winding ending section 2313 extending from the winding end in the opposite direction of the winding direction D exceeds two turns, and each turn of the winding ending section 2313 may be provided with at least one first tab 2314.

The positive electrode sheet includes a positive electrode current collector and a positive electrode active material layer, a surface of the positive electrode current collector is coated with the positive electrode active material layer, the positive electrode current collector not coated with the positive electrode active material layer protrudes from the positive electrode current collector already coated with the positive electrode active material layer, and the positive electrode current collector not coated with the positive electrode active material layer is used as the positive electrode tab 2311. Taking a lithium-ion battery as an example, the material of the positive electrode current collector may be aluminum, and the positive active material may be lithium cobalt oxide, lithium iron phosphate, ternary lithium, lithium manganate, or the like. The negative electrode sheet includes a negative electrode current collector and a negative electrode active material layer, a surface of the negative electrode current collector is coated with the negative electrode active material layer, the negative electrode current collector not coated with the negative electrode active material layer protrudes from the negative electrode current collector already coated with the negative electrode active material layer, and the negative electrode current collector not coated with the negative electrode active material layer is used as the negative electrode tab 2312. The material of the negative electrode current collector may be copper, and the negative electrode active material may be carbon, silicon, or the like. In order to ensure that no fusing occurs when a large current passes, there are the plurality of positive electrode tabs 2311 which are laminated together, and there are the plurality of negative electrode tabs 2312 which are laminated together. A separator may be made from polypropylene (PP), polyethylene (PE), or the like.

The positive electrode sheet has the positive electrode tab 2311, which can be the positive electrode current collector not coated with the positive electrode active material layer in the positive electrode sheet as the positive electrode tab 2311, and the negative electrode sheet has the negative electrode tab 2312, which can be the negative electrode current collector not coated with the negative electrode active material layer in the negative electrode sheet as the negative electrode tab 2312. The positive electrode tab 2311 and the negative electrode tab 2312 of the wound electrode assembly 23 may be located at one end of the electrode assembly in an axial direction B, or may be located at both ends of the electrode assembly in the axial direction B respectively. FIG. 5 shows a schematic structural diagram in which the positive electrode tab 2311 and the negative electrode tab 2312 are located at the same end of the electrode assembly in the axial direction B. In FIG. 5, the positive electrode tab 2311 of the positive electrode sheet and the negative electrode tab 2312 of the negative electrode sheet are arranged at intervals in a length direction A of the electrode assembly.

Therefore, the "electrode sheet 231" described in the present embodiment may be the positive electrode sheet or the negative electrode sheet. When the "electrode sheet 231" is the positive electrode sheet, the first tab 2314 is the positive pole tab, and when the "electrode sheet 231" is the negative electrode sheet, the first tab 2314 is the negative electrode tab.

"The plurality of first tabs 2314 are laminated" means that the plurality of first tabs 2314 are sequentially arranged in a linear direction, and two adjacent first tabs 2314 at least partially overlap. In some embodiments, the plurality of first tabs 2314 are laminated in a thickness direction C of the electrode assembly, the plurality of first tabs 2314 are located on one side of a thickness center plane P of the electrode assembly 23, and the thickness center plane P of the electrode assembly 23 refers to a plane coplanar with a winding center axis of the electrode assembly 23 and perpendicular to the thickness direction C of the electrode assembly. In some other embodiments, the plurality of first tabs 2314 may be located on both sides of the thickness center plane P of the electrode assembly 23.

When the electrode sheet 231 is in a winding state, the "width of the first tabs 2314" is a maximum size of the first tabs 2314 in a winding direction D, and misalignment of the first tabs 2314 refers to that projections of the two adjacent first tabs 2314 partially overlap in a stacking direction of the first tabs 2314, and the total amount of misalignment of the plurality of first tabs 2314 refers to a maximum width of the projections of the plurality of first tabs 2314 in the stacking direction of the first tabs 2314. "The width of the first tabs 2314" refers to a maximum size of the first tabs 2314 in the length direction E (shown in FIG. 7) of the electrode sheet when the electrode sheet 231 is in an expanded state.

The plurality of first tabs 2314 are laminated, and among the two adjacent first tabs 2314, the width of the first tab 2314 close to the winding center is greater than the width of the first tab 2314 away from the winding center. In other words, from inside to outside, the widths of the plurality of first tabs 2314 gradually decrease, and after the winding ending section 2313 is wound, the amount of misalignment between the two adjacent first tabs 2314 is reduced in the width direction of the first tabs 2314, so that the total amount of misalignment shown by the plurality of first tabs 2314 is small, the risk of short circuit caused by the large amount of misalignment of the plurality of first tabs 2314 in the width direction of the first tabs 2314 of the electrode assembly 23 is reduced, and safety performance of the battery cell 20 is improved.

Generally, the tabs of the electrode assembly 23 will be electrically connected with other components (such as the current collecting component 224) by welding and other modes, so as to draw out electric energy, but the area of a region of the current collecting component 224 for connection is limited, and a part of the tab of the electrode assembly 23 beyond the connection region of the current collecting component 224 will not be able to be connected with the current collecting component 224, which easily brings the risk of short circuit inside the battery cell 20. The total amount of misalignment shown by the plurality of first tabs 2314 is small, so the same connection region can correspond to more first tabs 2314, which is beneficial to increase the size of the electrode assembly in the thickness direction C, and can improve the energy density of the battery cell 20.

It should be noted that "from the inside to the outside" refers to a direction in the winding center of the electrode assembly 23 facing toward the first tabs 2314 with respect to the first tabs 2314 relative to the winding center of the electrode assembly 23. "Inside" refers to the winding center of the electrode assembly 23, and "outside" refers to the outer side of the electrode assembly 23.

With continued reference to FIG. 7, in some embodiments, the electrode sheet 231 further includes a winding start section 2315 connected with the winding ending section 2313, the winding start section 2315 is provided with a second tab 2316, and the second tab 2316 and the plurality of the first tabs 2314 are laminated. A width of the second tab 2316 is greater than or equal to a width of the first tab 2314 closest to the winding center among the plurality of first tabs 2314.

In the winding process, the winding start section 2315 completes winding prior to the winding ending section 2313, and the second tab 2316 is arranged in the winding start section 2315, so the second tab 2316 is closer to the winding center of the electrode assembly 23 relative to the plurality of first tabs 2314.

The winding start section 2315 extends at least one turn from a winding start end of the electrode sheet 231 in the winding direction D, and each turn of the winding start section 2315 may be provided with at least one second tab 2316.

The quantity of the second tabs 2316 may be one or more. In an embodiment in which the quantity of the second tabs 2316 is multiple, "the second tabs 2316 and the plurality of first tabs 2314 are laminated" means that the plurality of second tabs 2316 are laminated, and a direction in which the plurality of second tabs 2316 are laminated is the same as a direction in which the plurality of first tabs 2314 are laminated.

If the first tabs 2314 and the second tabs 2316 belong to the same electrode sheet 231, polarity of the second tabs 2316 and polarity of the first tabs 2314 are the same. In an embodiment in which the first tabs 2314 are the positive electrode tabs 2311, the second tabs 2316 are the positive electrode tabs 2311, and in an embodiment in which the first tabs 2314 are the negative electrode tabs 2312, the second tabs 2316 are the negative electrode tabs 2312.

In some embodiments, the width of each second tab 2316 is greater than a width of the innermost first tab 2314 of the plurality of first tabs 2314. In some other embodiments, the width of each second tab 2316 is equal to a width of the innermost first tab 2314 of the plurality of second tabs 2316.

In an actual winding process, the amount of misalignment of the second tab 2316 on the winding start section 2315 of the electrode assembly 23 is small in a width direction of the second tab 2316, therefore, the width of the second tab 2316 is greater than or equal to the width of the plurality of first tabs 2314, so that the tabs of the electrode assembly 23 may have a good current-carrying capacity and a good heat-dissipating capacity without affecting the total amount of misalignment of the electrode sheet 231.

In some embodiments, the quantity of the second tabs 2316 is multiple, the plurality of second tabs 2316 are laminated, and the widths of the plurality of second tabs 2316 are equal.

The widths of the plurality of second tabs 2316 are equal, which not only facilitates manufacturing, but also enables the tabs to have the good current-carrying capacity and heat-dissipating capacity in a case of matching the connection region of the current collecting component 224.

In some embodiments, the quantity of the second tabs 2316 is less than or equal to 25.

The quantity of the second tabs 2316 is less than or equal to 25, and only includes the second tabs 2316 on the same side as the plurality of first tabs 2314 and laminated with the plurality of first tabs 2314 in the same direction.

As a winding radius of the electrode sheet 231 increases, the amount of misalignment of the tabs increases. In a case that the quantity of the second tabs 2316 is less than or equal to 25, the total amount of misalignment of the first tabs 2314 of the electrode assembly 23 in the width direction of the first tabs 2314 can be effectively reduced, and the risk of the short circuit caused by the large amount of misalignment of the plurality of first tabs 2314 in the width direction of the first tabs 2314 is reduced.

In some embodiments, the quantity of the second tabs 2316 is multiple, and the plurality of second tabs 2316 are laminated. Among the two adjacent second tabs 2316, the width of the second tab 2316 close to the winding center is greater than the width of the second tab 2316 away from the winding center.

The plurality of second tabs 2316 are laminated in the same direction as the stacking direction of the plurality of first tabs 2314, and among the two adjacent second tabs 2316, the width of the second tabs 2316 close to the winding center is greater than the width of the second tabs 2316 away from the winding center. In other words, from the inside to the outside, the widths of the plurality of second tabs 2316 gradually decrease, so that the second tabs 2316 have the good current-carrying capacity and the good heat-dissipating capacity.

With continued reference to FIG. 7, in some embodiments, the first tabs 2314 have connection ends 23141 and free ends 23142, and the connection ends 23141 are connected to one end of the winding ending section 2313 in the width direction F of the electrode sheet; and the width of each first tab 2314 of the plurality of first tabs 2314 gradually decreases in a direction from the connection ends 23141 to the free ends 23142.

When the electrode sheet 231 is wound to form the electrode assembly 23, the width direction F of the electrode sheet is consistent with an axial direction B of the electrode assembly 23. When the electrode sheet 231 is in the expanded state, the width direction F of the electrode sheet is perpendicular to the length direction E of the electrode sheet.

The free ends 23142 of the first tabs 2314 refer to the end opposite to the connection ends 23141 and not connected with the winding ending section 2313. In the direction from the connection ends 23141 to the free ends 23142, there are many structures in which the width of each first tab 2314 in the plurality of first tabs 2314 gradually decreases. For example, the first tabs 2314 are each an isosceles trapezoid or a right-angled trapezoid.

In the direction from the connection ends 23141 to the free ends 23142 of the first tabs 2314, the width of each first tab 2314 gradually decreases to avoid interference with other components. In addition, on the basis of ensuring a welding area between the first tabs 2314 and other components, the connection strength between the first tabs 2314 and the winding ending section 2313 is increased.

In some other embodiments, the width of each first tab 2314 is equal in the direction from the connection ends to the free ends 23142 of the first tabs 2314.

With continued reference to FIG. 7, in some embodiments, a width difference between the two adjacent first tabs 2314 is equal.

"The width difference between the two adjacent first tabs 2314 is equal" means that, taking one first tab 2314 as a reference, the width difference between the first tab 2314 and the first tab 2314 on its inner side is equal to the width difference between the first tab 2314 and the first tab 2314 on its outer side.

In the direction of the first tabs 2314 facing away from the winding center, the widths of the plurality of first tabs 2314 decrease linearly, which can reduce the total amount of misalignment of the plurality of first tabs 2314 in the width direction of the first tabs 2314, and reduce the risk of the short circuit caused by the large amount of misalignment of the plurality of first tabs 2314 in the width direction of the first tabs 2314.

Figures 8, 9:
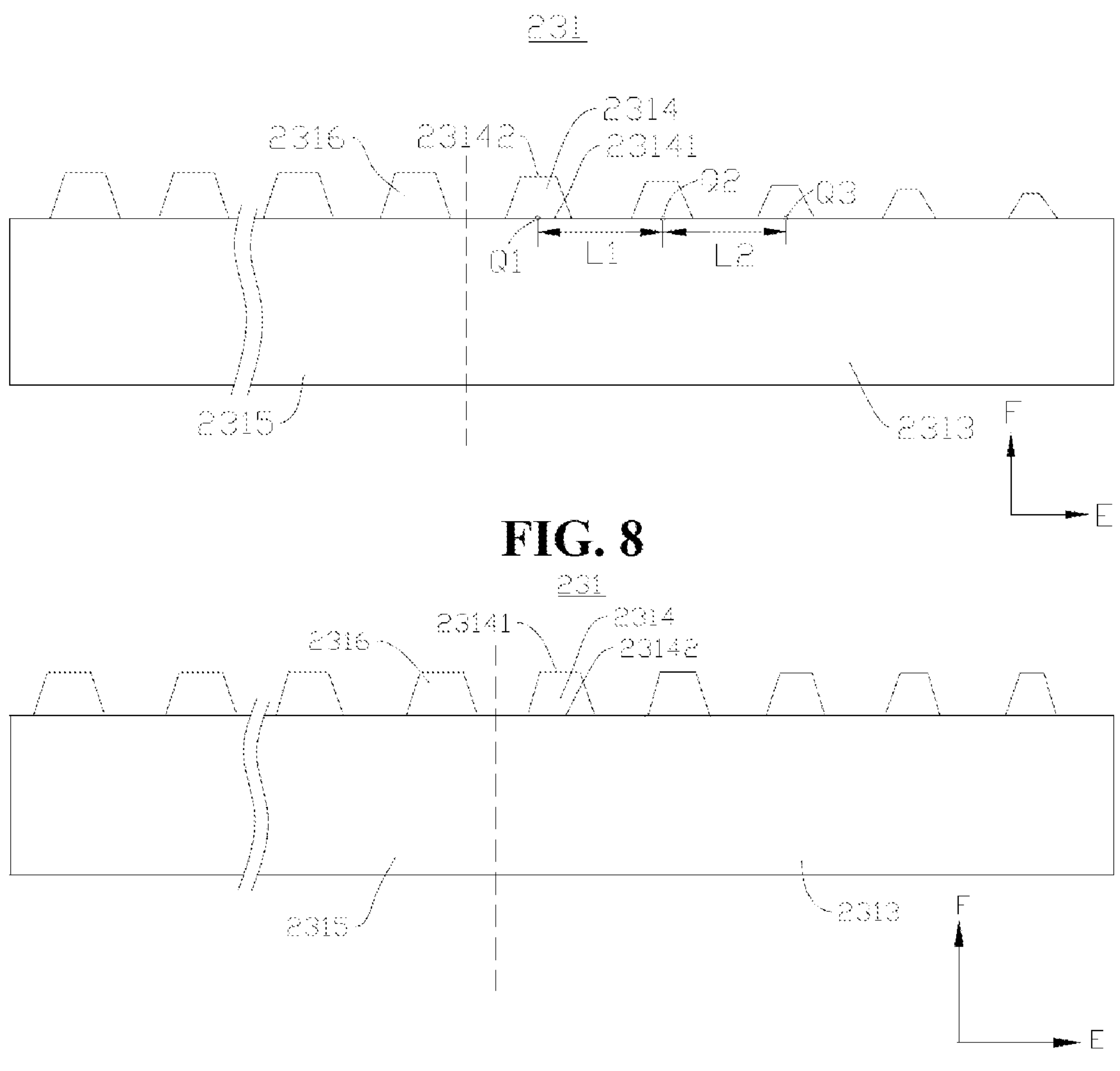
FIG. 8 is a schematic expanded view of an electrode sheet provided by some other embodiments of the present application.
FIG. 9 is a schematic expanded view of an electrode sheet provided by some another embodiments of the present application.

Please refer to FIG. 8, which is a schematic expanded view of an electrode sheet 231 provided by some other embodiments of the present application. In some embodiments, in the stacking direction of the plurality of first tabs 2314, the width difference between the two adjacent first tabs 2314 gradually increases in the direction of the plurality of first tabs 2314 facing away from the winding center.

"The width difference between the two adjacent first tabs 2314 gradually increases" means that, taking one first tab 2314 as a reference, the width difference between the first tab 2314 and the first tab 2314 on its inner side is less than the width difference between the first tab 2314 and the first tab 2314 on its outer side. In some embodiments, in the direction of the first tabs 2314 facing away from the winding center, the widths of the plurality of first tabs 2314 increase in a quadratic relationship, so that the width difference between the two adjacent first tabs 2314 gradually increases, which can reduce the total amount of misalignment of the plurality of first tabs 2314 in the width direction of the first tabs 2314, and reduce the risk of the short circuit caused by the large amount of misalignment of the plurality of first tabs 2314 in the width direction of the first tabs 2314.

In some embodiments, in the stacking direction of the plurality of first tabs 2314, the width difference between the two adjacent first tabs 2314 is 0.5 mm-4 mm in the direction of the plurality of first tabs 2314 facing away from the winding center. The width difference between the two adjacent first tabs 2314 is 0.5 mm-4 mm, which can effectively reduce the risk of the short circuit caused by the large amount of misalignment of the plurality of first tabs 2314 in the width direction of the first tabs 2314, and can further ensure the current-carrying capacity and the heat-dissipating capacity of the first tabs 2314. In the case where the width difference between the two adjacent first tabs 2314 is less than 0.5 mm, among the two adjacent first tabs 2314, the width of one first tab 2314 away from the winding center is not significantly decreased relative to the width of one first tab 2314 close to the winding center, and finally the total amount of misalignment of the plurality of first tabs 2314 is not significantly reduced, which cannot effectively reduce the risk of the short circuit caused by the large amount of misalignment of the plurality of first tabs 2314 in the width direction of the first tabs 2314. In the case where the width difference between the two adjacent first tabs 2314 is greater than 4 mm, among the two adjacent first tabs 2314, the width of one first tab 2314 away from the winding center is decreased too much relative to the width of one first tab 2314 close to the winding center, which makes it difficult to ensure the current-carrying capability and heat-dissipating capacity of the first tabs 2314.

With continued reference to FIG. 8, in some embodiments, in the stacking direction of the plurality of first tabs 2314, a height of the plurality of first tabs 2314 gradually decreases in the direction of the plurality of first tabs 2314 facing away from the winding center.

The "height of the first tabs 2314" refers to a maximum size between the free ends 23142 of the first tabs 2314 and the connection ends 23141 of the first tabs 2314. The heights of the first tabs 2314 may be equal or may not be equal in the winding direction D.

The height of the plurality of first tabs 2314 gradually decreases in the direction of the plurality of first tabs 2314 facing away from the winding center. That is, the width and height of the first tabs 2314 decrease synchronously, so that the risk of the first tabs 2314 are prone to being folded after the width decreases.

In some embodiments, a ratio of the width to the height of each first tab 2314 of the plurality of first tabs 2314 is the same.

The ratio of the width to the height of each first tab 2314 of the plurality of first tabs 2314 is the same. In other words, after the width of the first tabs 2314 decreases, the height of the first tabs 2314 synchronously decreases, which reduces the risk that the first tabs 2314 are prone to being folded after the width decreases.

Of course, in some embodiments, the heights of the plurality of first tabs 2314 may be the same. In some other embodiments, the ratio of the width to the height of each first tab 2314 of the plurality of first tabs 2314 may not be equal.

With continued reference to FIG. 8, in some embodiments, a distance between the two adjacent first tabs 2314 gradually increases in a winding direction D of the wound electrode assembly 23.

"In the winding direction D of the wound electrode assembly 23, the distance between the two adjacent first tabs 2314" refers to a distance between a center position of the first tab 2314 and a center position of its adjacent first tab 2314 in the winding direction D of the wound electrode assembly 23. In other words, when the electrode sheet 231 is in the expanded state, the "distance between the two adjacent first tabs 2314" refers to a distance between a center position of the two first tabs 2314 adjacent in the length direction E of the electrode sheet and a center position of its adjacent first tab 2314. Of course, in other embodiments, the "distance between the two adjacent first tabs 2314 in the winding direction D of the wound electrode assembly 23" may adopt other reference definitions, but should adopt the same reference when defining the distance between any two adjacent first tabs 2314 in the winding direction D. As shown in FIG. 8, in the figure, Q1, Q2 and Q3 are respectively middle positions of the three first tabs 2314 in the length direction E of the electrode sheet, a distance between Q1 and Q2 is L1, and a distance between Q2 and Q3 is L2. "The distance between the two adjacent first tabs 2314 gradually increases" means that L2 is greater than L1.

It should be noted that, after the electrode sheet 231 is wound, the winding direction D is consistent with the length direction E of the electrode sheet.

During the winding process, the more turns of winding, the greater the total amount of misalignment shown by the tabs, especially the greater the total amount of misalignment of the tabs of an outer ring layer. Therefore, the distance between the two adjacent first tabs 2314 gradually increases in the winding direction D of the wound electrode assembly 23, which can reduce the amount of misalignment of the two adjacent first tabs 2314, and thus reduce the risk of the short circuit caused by the large amount of misalignment of the plurality of first tabs 2314 in the width direction of the first tabs 2314.

Please refer to FIG. 9, which is a schematic expanded view of the electrode sheet 231 provided by some another embodiments of the present application. In some embodiments, the heights of each of the plurality of first tabs 2314 are the same.

In some embodiments, after winding, a projection of the first tab 2314 with the smaller width in the stacking direction of the first tab 2314 falls into a projection range of the first tab 2314 with the larger width in the stacking direction of the first tab 2314, and in the width direction of the first tab 2314, both ends of the first tab 2314 with the larger width exceed both ends of the first tab 2314 with the smaller width, and both ends of the first tab 2314 with the larger width exceed both ends of the first tab 2314 with the smaller width by the same value.

Figures 10, 11:
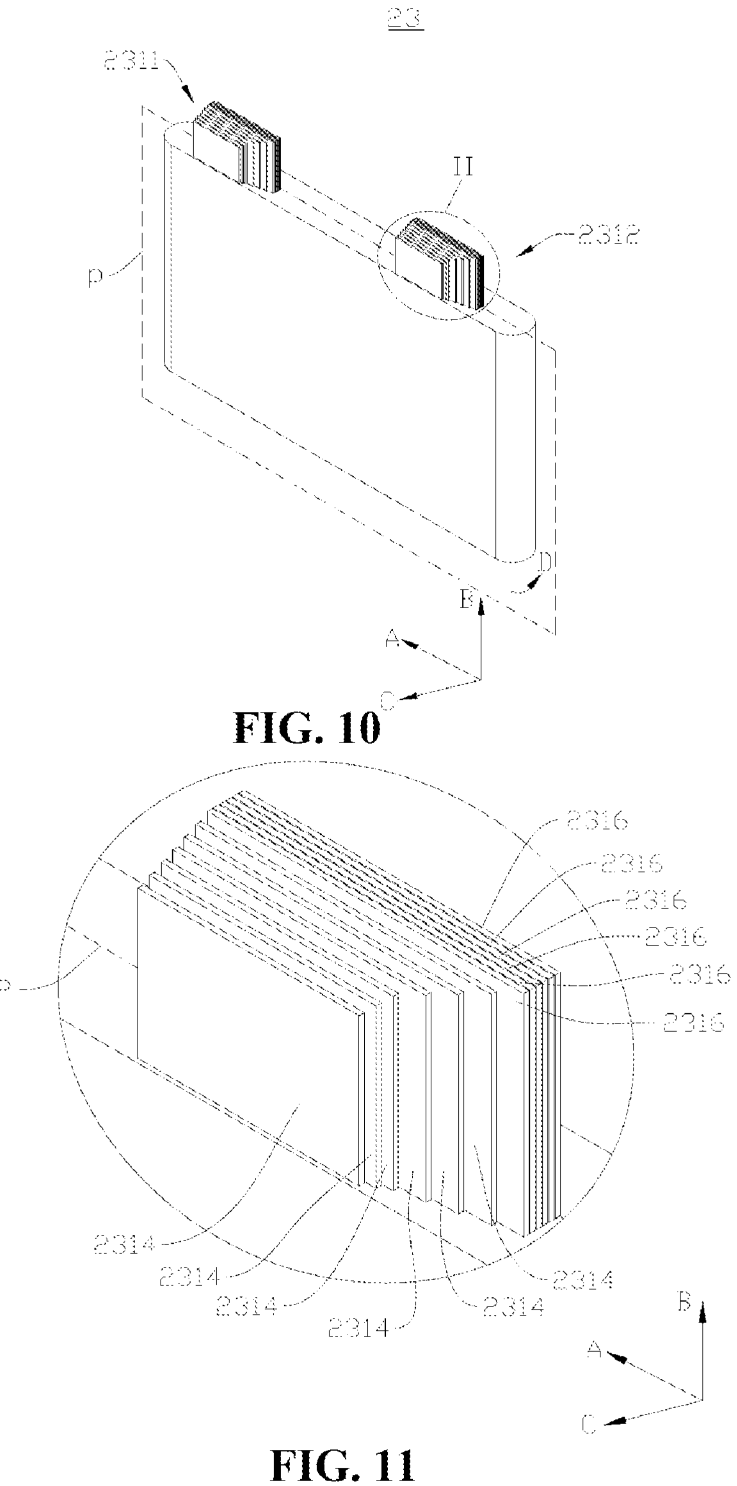
FIG. 10 is a schematic structural diagram of an electrode assembly provided by some other embodiments of the present application.
FIG. 11 is an enlarged view of II in FIG. 10.

Please refer to FIG. 10, which is a schematic structural diagram of an electrode assembly 23 provided by some other embodiments of the present application. FIG. 11 is an enlarged view of II in FIG. 10. In some embodiments, after winding, the projection of the first tab 2314 with the smaller width in the stacking direction of the first tab 2314 falls into the projection range of the first tab 2314 with the larger width in the stacking direction of the first tab 2314, and in the width direction of the first tab 2314, both ends of the first tab 2314 with the larger width exceed both ends of the first tab 2314 with the smaller width by the unequal value. In some other embodiments, in the width direction of the first tabs 2314, the projection of the first tab 2314 with the smaller width in the stacking direction of the first tab 2314 falls into the projection range of the first tab 2314 with the larger width in the stacking direction of the first tab 2314, one end of the first tab 2314 with the larger width exceeds one end of the first tab 2314 with the smaller width, and the other end of the first tab 2314 with the larger width is flush with another end of the first tab 2314 with the smaller width.

Figure 12:
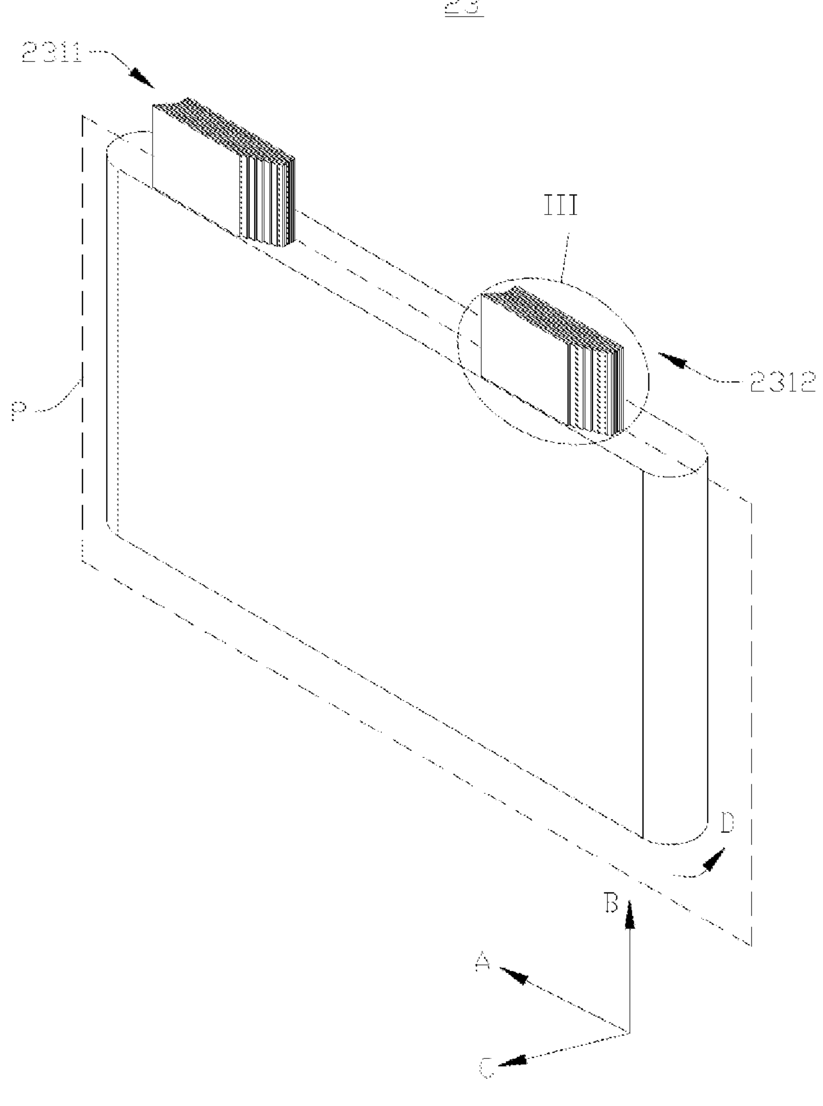
FIG. 12 is a schematic structural diagram of an electrode assembly provided by some another embodiments of the present application.
Figures 13, 14:
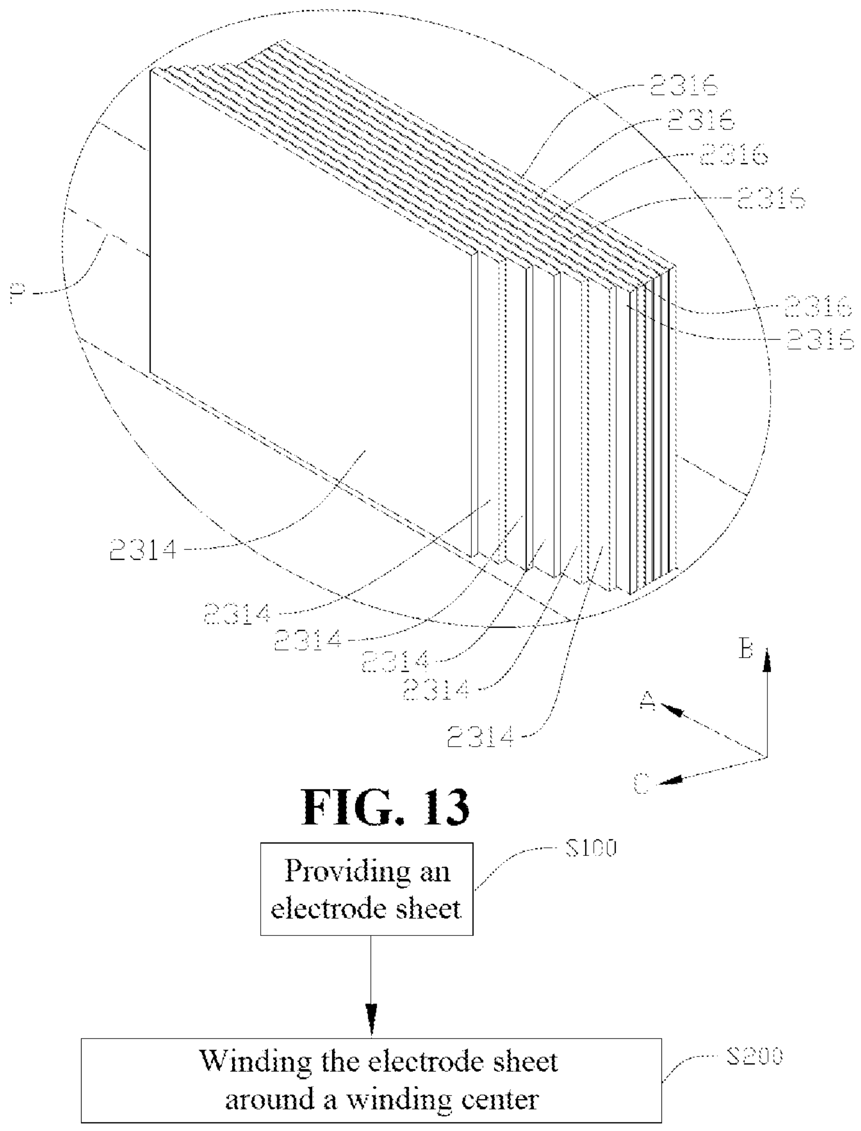
FIG. 13 is an enlarged view of II in FIG. 12.
FIG. 14 is a flow chart of a method for manufacturing a wound electrode assembly provided by some embodiments of the present application.

Please refer to FIG. 12, which is a schematic structural diagram of an electrode assembly 23 provided by some further embodiments of the present application, and FIG. 13 is an enlarged view of II in FIG. 12. After winding, the tabs of the electrode sheet 231 are partially overlapped. That is, the projection of the first tab 2314 with the smaller width in the stacking direction of the first tab 2314 partially falls into the projection range of the first tab 2314 with the larger width in the stacking direction of the first tab 2314, and in the width direction of the first tab 2314, one end of the first tab 2314 with the larger width exceeds one end of the first tab 2314 with the smaller width, and another end of the first tab 2314 with the smaller width exceeds another end of the first tab 2314 with the larger width.

In some embodiments, referring to FIG. 4 and FIG. 5, an embodiment of the present application provides a square battery 100. An electrode assembly 23 is arranged in a case 21, the electrode assembly 23 includes two electrode sheets 231, one of the two electrode sheets 231 is a positive electrode sheet, and the other is a negative electrode sheet. Each electrode sheet 231 includes a connected winding ending section 2313 and winding ending section 2313, the winding ending section 2313 is provided with a plurality of first tabs 2314, the winding start section 2315 is provided with a plurality of second tabs 2316, the first tabs 2314 are laminated, the plurality of second tabs 2316 are laminated, and a stacking direction of the plurality of first tabs 2314 is the same as a stacking direction of the plurality of second tabs 2316. Among the two adjacent first tabs 2314, a width of one first tab 2314 close to a winding center is greater than a width of one first tab 2314 away from the winding center, a width of each second tab 2316 is greater than the width of the innermost first tab 2314, and the widths of the plurality of second tabs 2316 are equal. It is equivalent to that starting from a certain turn, the width of the tabs of the electrode sheet 231 begins to decrease, even if the amount of misalignment of the outer ring layer is large, the total amount of misalignment shown by the tabs of the electrode sheet 231 will become smaller, thereby reducing a risk of short circuit caused by misalignment, which is further beneficial to increase the thickness design of the square shell battery 100 and improve the energy density.

The plurality of first tabs 2314 and the plurality of second tabs 2316 are located on the same side of a thickness center plane P, and the first tabs 2314 and the second tabs 2316 of each electrode sheet 231 are located at one end of the electrode assembly in an axial direction B. The tabs of the two electrode sheets 231 are located at the same end of the electrode assembly in the axial direction B.

An embodiment of the present application further provides a battery cell 20. The battery cell 20 includes a case 21 and the wound electrode assembly 23 provided by any above embodiment.

An embodiment of the present application further provides a battery 100. The battery 100 includes a box body 10 and the battery 100 provided by the above embodiments. The battery 100 is accommodated in the box body 10.

An embodiment of the present application further provides an electrical device. The electrical device includes the battery cell 20 provided by the above embodiments.

Please refer to FIG. 14, which is a flow chart of a method for manufacturing a wound electrode assembly 23 provided by some embodiments of the present application. An embodiment of the present application further provides a method for manufacturing a wound electrode assembly 23, including:

step S100, providing an electrode sheet 231, wherein the electrode sheet 231 includes a winding ending section 2313, and the winding ending section 2313 is provided with a plurality of first tabs 2314; and step S200, winding the electrode sheet 231 around a winding center, so that the plurality of the first tabs 2314 are laminated, wherein, among the two adjacent first tabs 2314, a width of the first tab 2314 close to the winding center of the wound electrode assembly 23 is greater than a width of the first tab 2314 away from the winding center.

The electrode sheet 231 is wound around the winding center, so that the plurality of the first tabs 2314 are laminated. The total amount of misalignment shown by the plurality of first tabs 2314 is small, which reduces a risk of a short circuit caused by the large amount of misalignment of the plurality of first tabs 2314 in a width direction of the first tabs 2314, can also improve safety performance of a battery cell 20, and improves electrical safety of an electrical device. The total amount of misalignment shown by the plurality of first tabs 2314 is small, therefore the same region can correspond to more first tabs 2314, which is beneficial to increase a size of the electrode assembly in a thickness direction C, and improves energy density of the battery cell 20.

Figure 15:
FIG. 15 is a structural sketch of a manufacturing apparatus for a wound electrode assembly provided by some embodiments of the present application.
Figure 15:
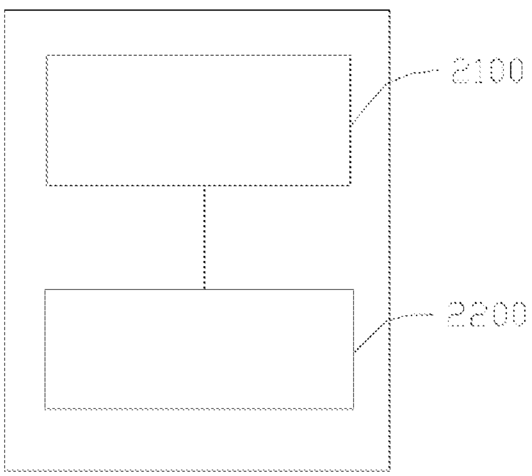

Please refer to FIG. 15, which is a structural sketch of a manufacturing apparatus 2000 for a wound electrode assembly provided by some embodiments of the present application. An embodiment of the present application further provides a manufacturing apparatus 2000 for a wound electrode assembly, including a providing means 2100 and an assembling means 2200. The providing means 2100 is configured to provide an electrode sheet 231, wherein the electrode sheet 231 includes a winding ending section 2313, and the winding ending section 2313 is provided with a plurality of first tabs 2314. The assembling means 2200 is configured to wind the electrode sheet 231 around a winding center, so that the plurality of the first tabs 2314 are laminated, wherein, among the two adjacent first tabs 2314, a width of the first tab 2314 close to the winding center of the wound electrode assembly 23 is greater than a width of the first tab 2314 away from the winding center.

The assembling means 2200 winds the electrode sheet 231 around the winding center, so that the plurality of the first tabs 2314 are laminated. The total amount of misalignment of the plurality of first tabs 2314 is small, which reduces a risk of a short circuit caused by the large amount of misalignment of the plurality of first tabs 2314 in a width direction of the first tabs 2314, can also improve safety performance of a battery cell 20, and improves electrical safety of an electrical device. The total amount of misalignment shown by the plurality of first tabs 2314 is small, therefore the same region can correspond to more first tabs 2314, which is beneficial to increase a size of the electrode assembly in a thickness direction C, and improves energy density of the battery cell 20.

The above are only preferred embodiments of the present application, and are not intended to limit the present application. For those skilled in the art, the present application may have various modifications and changes. Any modifications, equivalent replacements, improvements, and the like made within the spirit and principle of the present application shall be included within the protection scope of the present application.

What is claimed is:

1. A wound electrode assembly, comprising:

an electrode sheet, comprising a winding ending section, wherein the winding ending section is provided with a plurality of first tabs, the plurality of first tabs are laminated, and among any two adjacent first tabs, a width of a first tab of said two adjacent first tabs that is closest to a winding center of the wound electrode assembly is greater than a width of a first tab of said two adjacent first tabs that is away from the winding center; wherein the electrode sheet further comprises a winding start section connected with the winding ending section, the winding start section is provided with at least one second tab, the at least one second tab and the plurality of the first tabs being laminated; and a width of the at least one second tab is greater than or equal to the width of a first tab that is closest to the winding center among the plurality of first tabs.

2. The wound electrode assembly according to claim 1, wherein the at least one second tabs comprises a plurality of second tabs, the plurality of second tabs are laminated, and the widths of the plurality of second tabs are equal.

3. The wound electrode assembly according to claim 2, wherein the quantity of the second tabs is less than or equal to 25.

4. The wound electrode assembly according to claim 1, wherein the at least one second tab comprises a plurality of second tabs, and among any two adjacent second tabs, a width of the second tab of said two adjacent second tabs that is closest to the winding center is greater than a width of the second tab of said two adjacent second tabs that is away from the winding center.

5. The wound electrode assembly according to claim 1, wherein the first tabs have connection ends and free ends, and the connection ends are connected to one end of the winding ending section in a width direction of the electrode sheet; and in a direction from the connection ends to the free ends, the width of each first tab of the plurality of first tabs gradually decreases.

6. The wound electrode assembly according to claim 1, wherein a width difference between any two adjacent first tabs is equal.

7. The wound electrode assembly according to claim 1, wherein a width difference between any two adjacent first tabs gradually increases in a direction of the plurality of first tabs facing away from the winding center.

8. The wound electrode assembly according to claim 1, wherein a width difference between any two adjacent first tabs is 0.5 mm-4 mm in a direction of the plurality of first tabs facing away from the winding center.

9. The wound electrode assembly according to claim 1, wherein a height of the plurality of first tabs gradually decreases in a direction of the plurality of first tabs facing away from the winding center.

10. The wound electrode assembly according to claim 9, wherein a ratio of width to height of each first tab of the plurality of first tabs is the same.

11. The wound electrode assembly according to claim 1, wherein a distance between any two adjacent first tabs gradually increases in a winding direction of the wound electrode assembly.

12. A battery cell, comprising:

a case; and a wound electrode assembly according to claim 11, wherein the wound electrode assembly is accommodated in the case.

13. A battery, comprising:

a box body; and a battery cell according to claim 12, wherein the battery cell is accommodated in the box body.

14. An electrical device, comprising the battery cell according to claim 12.

15. A method for manufacturing a wound electrode assembly, comprising:

providing an electrode sheet, wherein the electrode sheet includes a winding ending section, and the winding ending section is provided with a plurality of first tabs; and winding the electrode sheet, so that the plurality of the first tabs are laminated;

wherein, among any two adjacent first tabs, a width of the first tab of the two adjacent first tabs that is closest to the winding center of the wound electrode assembly is greater than a width of the first tab of the two adjacent first tabs that is away from the winding center;

wherein the electrode sheet further comprises a winding start section connected with the winding ending section, the winding start section is provided with at least one second tab, the at least one second tab and the plurality of the first tabs being laminated; and a width of the at least one second tab is greater than or equal to the width of a first tab that is closest to the winding center among the plurality of first tabs.

16. The wound electrode assembly according to claim 1, wherein the first tabs and the at least one second tab being arranged such that the at least one second tab and the plurality of the first tabs are laminated on a same side of a thickness center plate of the wound electrode assembly.

17. A manufacturing apparatus for a wound electrode assembly, comprising:

a providing means, configured to provide an electrode sheet, wherein the electrode sheet comprises a winding ending section, and the winding ending section is provided with a plurality of first tabs; and an assembling means, configured to wind the electrode sheet around a winding center, so that the plurality of the first tabs are laminated;

wherein, among any two adjacent first tabs, a width of the first tab of the two adjacent first tabs that is closest to the winding center of the wound electrode assembly is greater than a width of the first tab of the two adjacent first tabs that is away from the winding center;

wherein the electrode sheet further comprises a winding start section connected with the winding ending section, the winding start section is provided with at least one second tab, the at least one second tab and the plurality of the first tabs being laminated; and a width of the at least one second tab is greater than or equal to the width of a first tab that is closest to the winding center among the plurality of first tabs.

* * * * *